(12) United States Patent
Seo

(10) Patent No.: US 10,375,531 B2
(45) Date of Patent: Aug. 6, 2019

(54) METHOD FOR TRANSMITTING/RECEIVING MBMS SIGNAL IN WIRELESS COMMUNICATION SYSTEM AND DEVICE FOR PERFORMING SAME

(71) Applicant: LG ELECTRONICS INC., Seoul (KR)

(72) Inventor: Inkwon Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/747,366

(22) PCT Filed: Aug. 26, 2016

(86) PCT No.: PCT/KR2016/009520
§ 371 (c)(1),
(2) Date: Jan. 24, 2018

(87) PCT Pub. No.: WO2017/039240
PCT Pub. Date: Mar. 9, 2017

(65) Prior Publication Data
US 2018/0213366 A1  Jul. 26, 2018

Related U.S. Application Data

(60) Provisional application No. 62/211,000, filed on Aug. 28, 2015.

(51) Int. Cl.
*H04W 4/06* (2009.01)
*H04W 52/14* (2009.01)
(Continued)

(52) U.S. Cl.
CPC .......... *H04W 4/06* (2013.01); *H04L 1/00* (2013.01); *H04L 5/0048* (2013.01);
(Continued)

(58) Field of Classification Search
CPC combination set(s) only.
See application file for complete search history.

(56) References Cited

U.S. PATENT DOCUMENTS 10,020,927 B2 * 7/2018 Lee ................. H04L 27/0012
2012/0195221 A1   8/2012 Wang et al.
(Continued)

FOREIGN PATENT DOCUMENTS

WO   WO 2015/060608 A1   4/2015
WO   WO 2015/065053 A1   5/2015

*Primary Examiner* — Yee F Lam
(74) *Attorney, Agent, or Firm* — Birch, Stewart, Kolasch & Birch, LLP

(57) ABSTRACT

According to one embodiment of the present invention, a method by which a terminal receives a multimedia broadcast multicast service (MBMS) signal on the basis of non-orthogonal multiple access (NOMA) operation in a wireless communication system comprises the steps of: receiving an MBMS signal including a basic MBMS layer and an extended MBMS layer multiplexed by different power values on a power domain; and clearing of the basic MBMS layer from the received MBMS signal so as to acquire the extended MBMS layer, wherein the basic MBMS layer is received by a single frequency network (SFN) method from a serving cell and a neighbor cell, and the extended MBMS layer is received from the serving cell and not from the neighbor cell.

15 Claims, 14 Drawing Sheets

(51) Int. Cl.
*H04W 52/32* (2009.01)
*H04W 52/34* (2009.01)
*H04W 52/40* (2009.01)
*H04L 1/00* (2006.01)
*H04L 27/26* (2006.01)
*H04L 5/00* (2006.01)
*H04L 12/18* (2006.01)
*H04L 27/34* (2006.01)
*H04W 72/00* (2009.01)

(52) U.S. Cl.
CPC ............ *H04L 12/189* (2013.01); *H04L 27/26* (2013.01); *H04L 27/3488* (2013.01); *H04W 52/143* (2013.01); *H04W 52/32* (2013.01); *H04W 52/346* (2013.01); *H04L 5/005* (2013.01); *H04W 52/322* (2013.01); *H04W 52/327* (2013.01); *H04W 52/40* (2013.01); *H04W 72/005* (2013.01)

(56) References Cited

U.S. PATENT DOCUMENTS

| | | |
|---|---|---|
| 2012/0250553 A1 | 10/2012 | Huschke et al. |
| 2014/0254537 A1 | 9/2014 | Kim et al. |
| 2014/0293890 A1* | 10/2014 | Davydov ............. H04L 5/0085 370/329 |
| 2015/0264670 A1* | 9/2015 | Lee ...................... H04L 5/0007 370/312 |
| 2015/0312074 A1* | 10/2015 | Zhu .................... H04L 27/2627 370/329 |
| 2016/0142188 A1* | 5/2016 | Suzuki ................. H04W 24/10 370/329 |
| 2016/0309542 A1* | 10/2016 | Kowalski ............. H04W 76/27 |
| 2016/0330511 A1* | 11/2016 | Mori ..................... H04W 4/06 |
| 2017/0064519 A1* | 3/2017 | Li ........................ H04L 12/18 |
| 2017/0223662 A1* | 8/2017 | Xu ...................... H04L 65/1069 |
| 2018/0069651 A1* | 3/2018 | Davydov ............. H04L 5/0001 |
| 2018/0227923 A1* | 8/2018 | Zhang ................... H04W 4/06 |

\* cited by examiner

FIG. 5
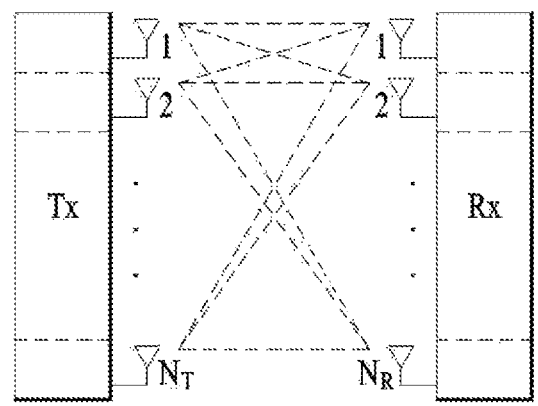
(a)
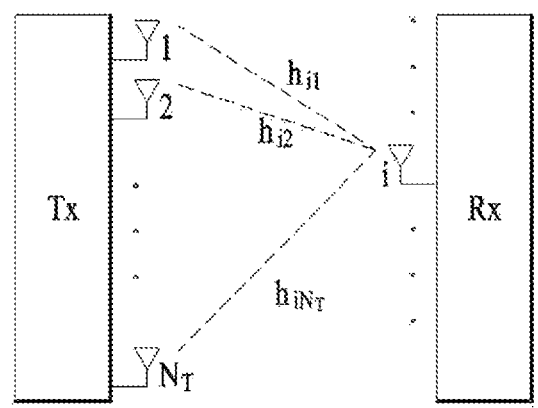
(b)

FIG. 11
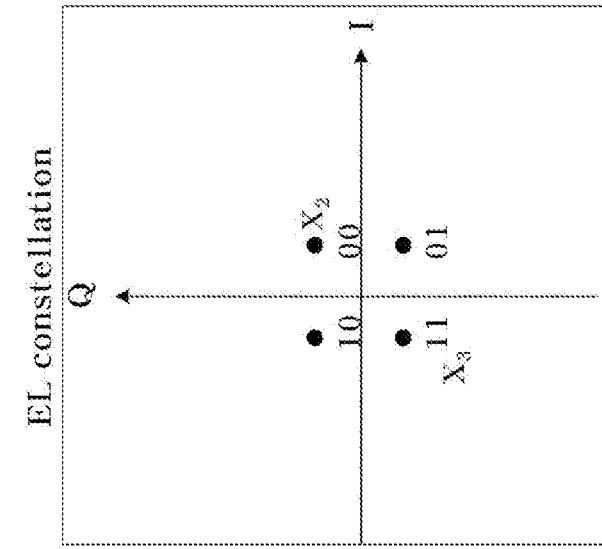
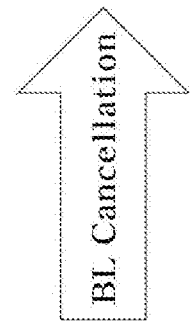
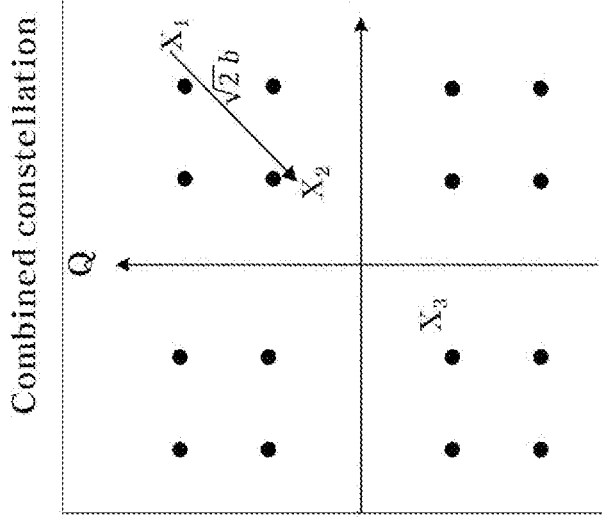

METHOD FOR TRANSMITTING/RECEIVING MBMS SIGNAL IN WIRELESS COMMUNICATION SYSTEM AND DEVICE FOR PERFORMING SAME

CROSS REFERENCE TO RELATED APPLICATIONS

This application is the National Phase of PCT International Application No. PCT/KR2016/009520, filed on Aug. 26, 2016, which claims priority under 35 U.S.C. 119(e) to U.S. Provisional Application No. 62/211,000, filed on Aug. 28, 2015, all of which are hereby expressly incorporated by reference into the present application.

TECHNICAL FIELD

The present invention relates to a wireless communication system, and more particularly, to a method of transmitting or receiving an MBMS (multimedia broadcast/multicast service) signal in a wireless communication system supportive of non-orthogonal multiple access and apparatus for performing the same.

BACKGROUND ART

Wireless communication systems have been widely deployed to provide various types of communication services such as voice or data. In general, a wireless communication system is a multiple access system that supports communication with multiple users by sharing available system resources (e.g., bandwidth, transmit power, etc.). The multiple access system can be categorized into orthogonal multiple access (OMA) and non-orthogonal multiple access (NOMA) depending on whether orthogonality is guaranteed.

As examples of the OMA, frequency division multiple access (FDMA), time division multiple access (TDMA), code division multiple access (CDMA), spatial domain multiple access (SDMA) are included. For each of them, the multiple access is performed in a frequency domain, time domain, code domain, and spatial domain.

Meanwhile, as a multiple access scheme in a power domain, the NOMA can be interconnected with the OMA, whereby it is possible to improve spectral efficiency.

DISCLOSURE OF THE INVENTION

Technical Task

The technical task of the present invention is to provide a method of transmitting or receiving an MBMS signal more efficiently and accurately in a wireless communication system supportive of non-orthogonal multiple access (NOMA) and apparatus for performing the same.

Technical tasks obtainable from the present invention are non-limited by the above-mentioned technical task. And, other unmentioned technical tasks can be clearly understood from the following description by those having ordinary skill in the technical field to which the present invention pertains.

Technical Solutions

In one technical aspect of the present invention, provided herein is a method of receiving an multimedia broadcast multicast service (MBMS) signal by a user equipment based on a non-orthogonal multiple access (NOMA) operation in a wireless communication system, including receiving the MBMS signal including a basic MBMS layer and an enhanced MBMS layer which are multiplexed with different power values in a power domain and obtaining the enhanced MBMS layer by cancelling a power of the basic MBMS layer from the received MBMS signal, wherein the basic MBMS layer is received from a serving cell and a neighbor cell by single frequency network (SFN) scheme and wherein the enhanced MBMS layer is received from the serving cell except the neighbor cell.

In another technical aspect of the present invention, provided herein is a user equipment for receiving an multimedia broadcast multicast service (MBMS) signal based on a non-orthogonal multiple access (NOMA) operation in a wireless communication system, the user equipment including a receiver for receiving the MBMS signal including a basic MBMS layer and an enhanced MBMS layer which are multiplexed with different power values in a power domain and a processor for obtaining the enhanced MBMS layer by cancelling a power of the basic MBMS layer from the received MBMS signal, wherein the basic MBMS layer is received from a serving cell and a neighbor cell by single frequency network (SFN) scheme and wherein the enhanced MBMS layer is received from the serving cell except the neighbor cell.

The user equipment may assume that a ratio between energy per resource element (EPRE) of a power of a basic MBMS layer and EPRE of an multimedia broadcast single frequency network (MBSFN) reference signal is 0 dB.

The power of the basic MBMS layer canceled from the NOMA signal may include the power of the basic MBMS layer received from the serving cell and the power of the basic MBMS layer received from the neighbor cell.

The user equipment may measure the power of the basic MBMS layer transmitted by the neighbor cell through a nulled resource on which the serving cell does not perform the transmission of the basic MBMS layer.

The user equipment may correct a power offset between the basic MBMS layer and the enhanced MBMS layer signaled from the serving cell based on the power of the basic MBMS layer received from the neighbor cell.

A power higher than that of the enhanced MBMS layer may be assigned to the basic MBMS layer. The user equipment may obtain the basic MBMS layer from the MBMS signal by assuming the power of the enhanced MBMS layer as a noise.

The user equipment may improve a quality of a multimedia content provide through the basic MBMS layer using the enhanced MBMS layer.

The MBMS signal may be received through physical multicast channel (PMCH) and the serving cell and the neighbor cell may belong to a same multimedia broadcast single frequency network (MBSFN) area.

Advantageous Effects

According to one embodiment of the present invention, since a basic MBMS layer having a high power assigned thereto is transmitted by SFN scheme, a legacy UE failing to support NOMA can operate correctly. In case of a NOMA UE, since a power of a basic MBMS layer received from a neighbor cell is considered, an extended MBMS layer having a low power assigned thereto can be demodulated and decoded accurately and efficiently.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 5 is a schematic diagram illustrating a wireless communication system having multiple antennas.

FIG. 11 shows one example of BL data cancellation.

BEST MODE FOR INVENTION

Figure 1:
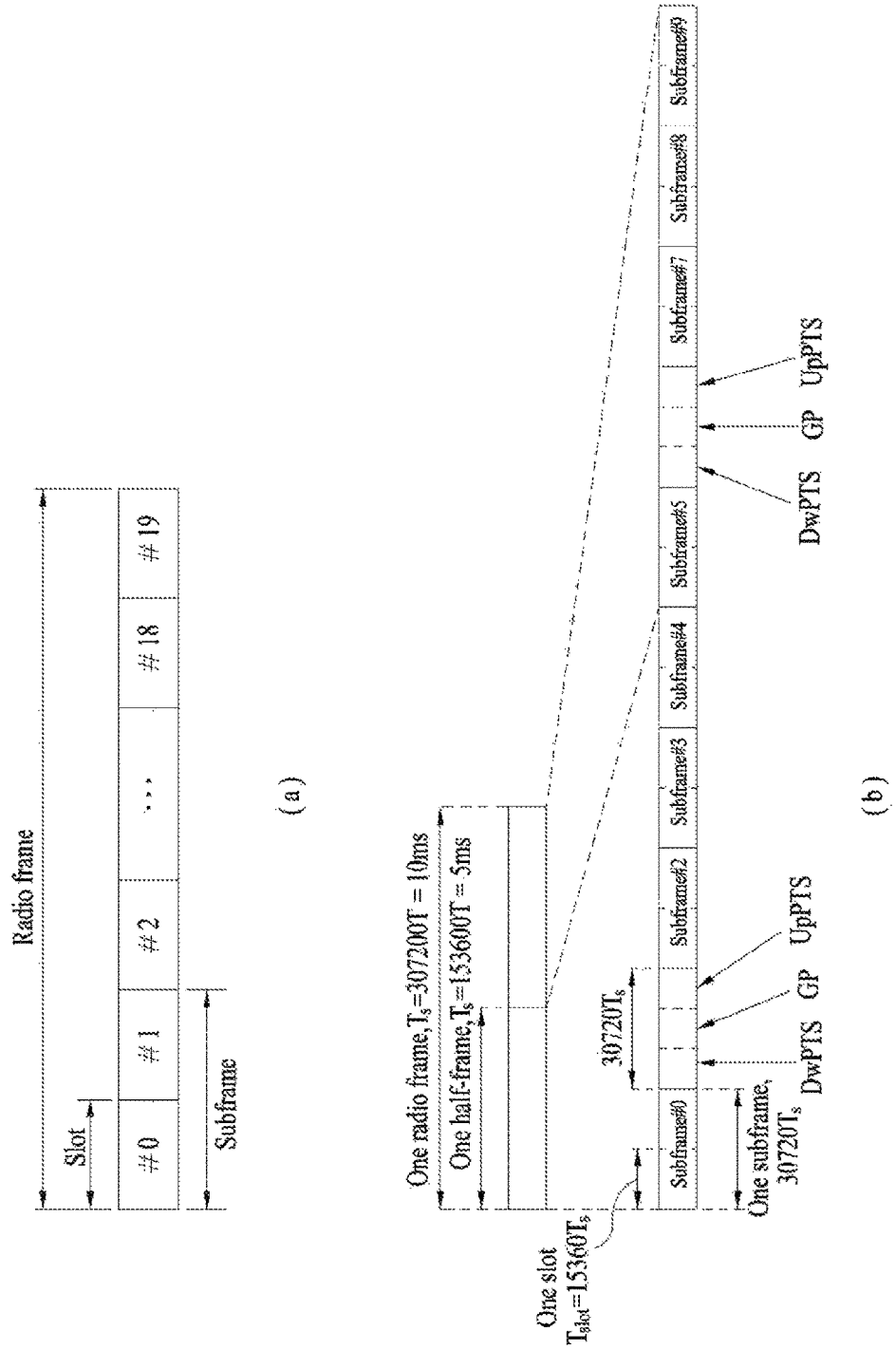
FIG. 1 is a diagram illustrating a radio frame structure.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the embodiments of the present invention, a description is made, centering on a data transmission and reception relationship between a Base Station (BS) and a User Equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'Relay Node (RN)' or 'Relay Station (RS)'. The term 'terminal' may be replaced with the term 'UE', 'Mobile Station (MS)', 'Mobile Subscriber Station (MSS)', 'Subscriber Station (SS)', etc.

The term "cell", as used herein, may be applied to transmission and reception points such as a base station (eNB), sector, remote radio head (RRH) and relay, and may also be extensively used by a specific transmission/reception point to distinguish between component carriers.

Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

NOMA Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunications System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (Wireless Metropolitan Area Network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present invention are not limited thereto.

LTE/LTE-A Resource Structure/Channel

With reference to FIG. 1, the structure of a radio frame will be described below.

In a cellular Orthogonal Frequency Division Multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to Frequency Division Duplex (FDD) and a type-2 radio frame structure applicable to Time Division Duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a Transmission Time Interval (TTI). For example, one subframe may be 1 ms in duration and one slot may be 0.5 ms in duration. A slot includes a plurality of OFDM symbols in the time domain and a plurality of Resource Blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a Cyclic Prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease Inter-Symbol Interference (ISI).

In the case of the normal CP, one subframe includes 14 OFDM symbols because one slot includes 7 OFDM symbols. The first two or three OFDM symbols of each subframe may be allocated to a Physical Downlink Control CHannel (PDCCH) and the other OFDM symbols may be allocated to a Physical Downlink Shared Channel (PDSCH).

FIG. 1(b) illustrates the type-2 radio frame structure. A type-2 radio frame includes two half frames, each having 5 subframes, a Downlink Pilot Time Slot (DwPTS), a Guard Period (GP), and an Uplink Pilot Time Slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
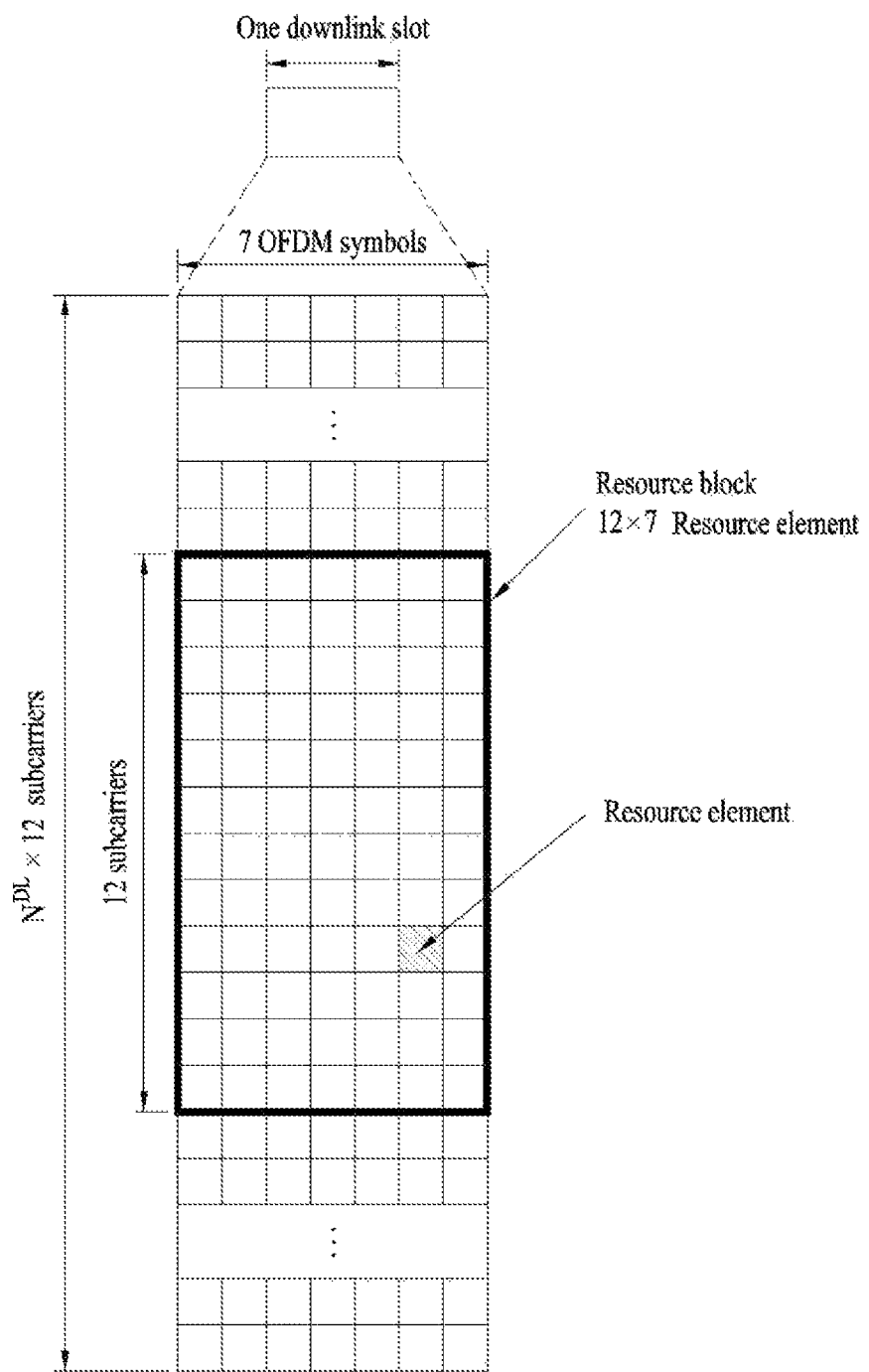
FIG. 2 is a diagram illustrating a resource grid of a downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present invention. For example, a downlink slot may include 7 OFDM symbols in the case of the normal CP, whereas a downlink slot may include 6 OFDM symbols in the case of the extended CP. Each element of the resource grid is referred to as a Resource Element (RE). An RB includes 12×7 REs. The number of RBs in a downlink slot, NDL depends on a downlink transmission bandwidth. An uplink slot may have the same structure as a downlink slot.

Figure 3:
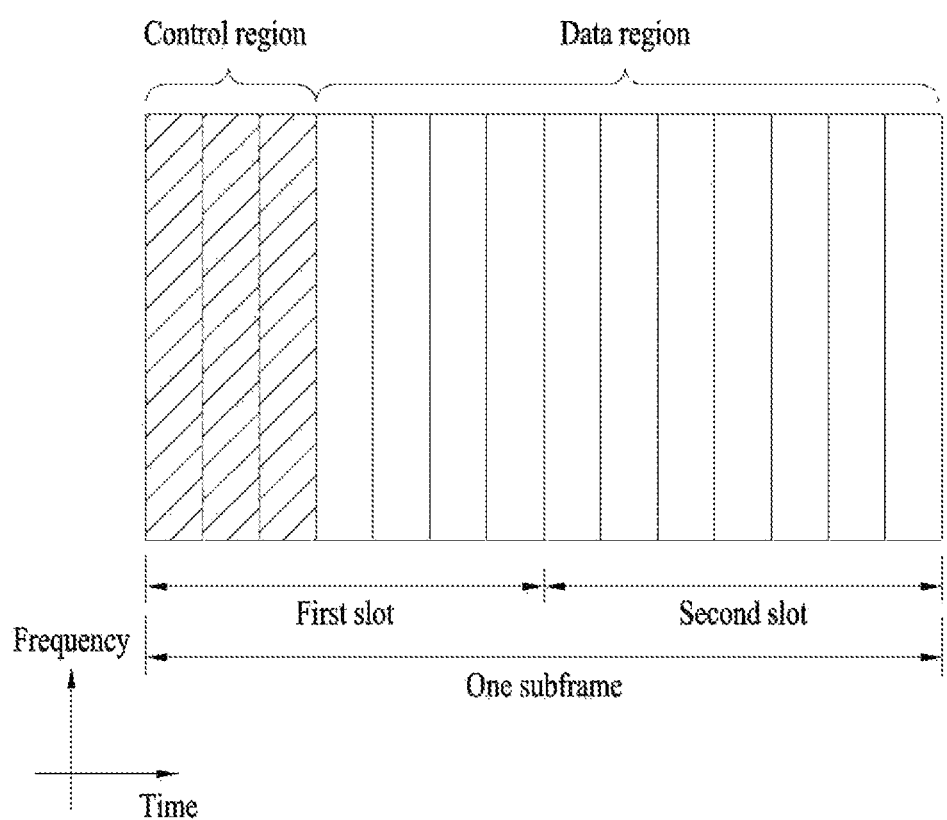
FIG. 3 is a diagram illustrating a downlink subframe structure.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a Physical Control Format Indicator CHannel (PCFICH), a Physical Downlink Control CHannel (PDCCH), and a Physical Hybrid automatic repeat request (HARQ) Indicator CHannel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called Downlink Control Information (DCI). The DCI transports uplink or downlink scheduling information, or uplink transmission power control commands for UE groups. The PDCCH delivers information about resource allocation and a transport format for a Downlink Shared CHannel (DL-SCH), resource allocation information about an Uplink Shared CHannel (UL-SCH), paging information of a Paging CHannel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregating one or more consecutive Control Channel Elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 4:
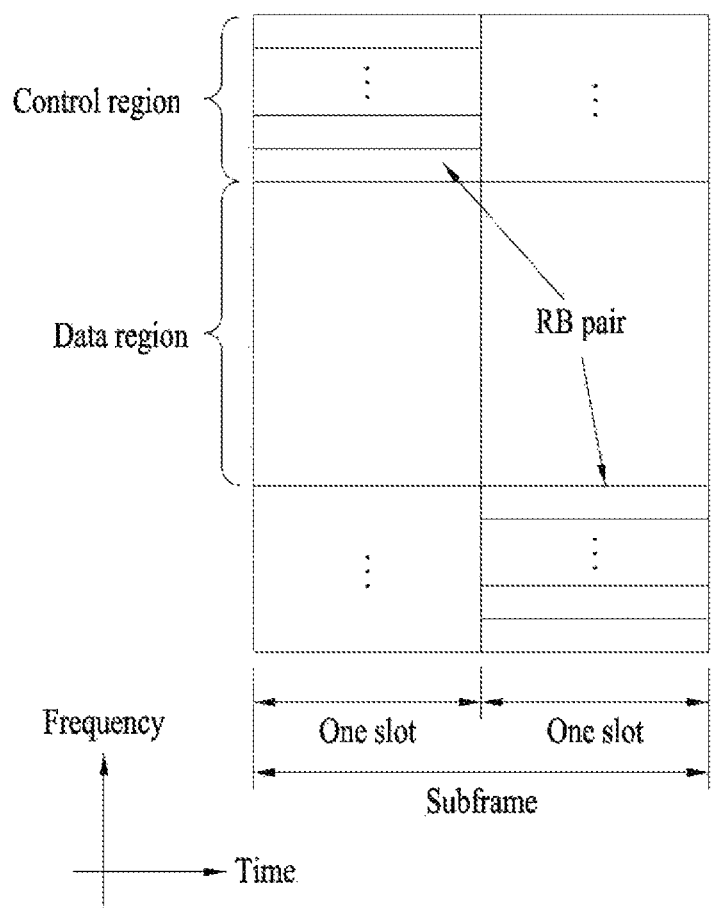
FIG. 4 is a diagram illustrating an uplink subframe structure.

FIG. 4 illustrates the structure of an uplink subframe. An uplink subframe may be divided into a control region and a data region in the frequency domain. A Physical Uplink Control CHannel (PUCCH) carrying uplink control information is allocated to the control region and a Physical Uplink Shared Channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signals (RSs)

In a wireless communication system, a packet is transmitted on a radio channel. In view of the nature of the radio channel, the packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between Transmission (Tx) antennas and Reception (Rx) antennas is required for successful signal reception. Accordingly, an RS should be transmitted through each Tx antenna.

RSs may be divided into downlink RSs and uplink RSs. In the current LTE system, the uplink RSs include:

i) DeModulation-Reference Signal (DM-RS) used for channel estimation for coherent demodulation of information delivered on a PUSCH and a PUCCH; and ii) Sounding Reference Signal (SRS) used for an eNB or a network to measure the quality of an uplink channel in a different frequency.

The downlink RSs are categorized into:

i) Cell-specific Reference Signal (CRS) shared among all UEs of a cell;

ii) UE-specific RS dedicated to a specific UE;

iii) DM-RS used for coherent demodulation of a PDSCH, when the PDSCH is transmitted;

iv) Channel State Information-Reference Signal (CSI-RS) carrying CSI, when downlink DM-RSs are transmitted;

v) Multimedia Broadcast Single Frequency Network (MBSFN) RS used for coherent demodulation of a signal transmitted in MBSFN mode; and vi) positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

Modeling of MIMO System

FIG. 5 is a diagram illustrating a configuration of a wireless communication system having multiple antennas.

As shown in FIG. 5(a), if the number of transmit antennas is increased to NT and the number of receive antennas is increased to NR, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate Ro upon utilization of a single antenna and a rate increase ratio Ri.

$$R_i = \min(N_T, N_R) \qquad \text{[Equation 1]}$$

For instance, in an MIMO communication system, which uses 4 transmit antennas and 4 receive antennas, a transmission rate 4 times higher than that of a single antenna system can be obtained. Since this theoretical capacity increase of the MIMO system has been proved in the middle of 90's, many ongoing efforts are made to various techniques to substantially improve a data transmission rate. In addition, these techniques are already adopted in part as standards for various wireless communications such as 3G mobile communication, next generation wireless LAN and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling can be represented as follows. It is assumed that there are NT transmit antennas and NR receive antennas.

Regarding a transmitted signal, if there are NT transmit antennas, the maximum number of pieces of information that can be transmitted is NT. Hence, the transmission information can be represented as shown in Equation 2.

$$s = [s_1, s_2, \ldots, s_{N_T}]^T \qquad \text{[Equation 2]}$$

Meanwhile, transmit powers can be set different from each other for individual pieces of transmission information $s_1, s_2, \ldots, s_{N_T}$, respectively. If the transmit powers are set to $P_1, P_2, \Lambda, P_{N_T}$, respectively, the transmission information with adjusted transmit powers can be represented as Equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \qquad \text{[Equation 3]}$$

In addition, $\hat{S}$ can be represented as Equation 4 using diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Equation 4]}$$

Assuming a case of configuring NT transmitted signals $x_1, x_2, \ldots, x_{N_T}$, which are actually transmitted, by applying weight matrix W to the information vector $\hat{S}$ having the adjusted transmit powers, the weight matrix W serves to appropriately distribute the transmission information to each antenna according to a transport channel state. $x_1, x_2, \ldots, x_{N_T}$ can be expressed by using the vector X as follows.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \qquad \text{[Equation 5]}$$

In Equation 5, $w_{ij}$ denotes a weight between an $i^{th}$ transmit antenna and $j^{th}$ information. W is also called a precoding matrix.

If the NR receive antennas are present, respective received signals $y_1, y_2, \ldots, y_{N_R}$ of the antennas can be expressed as follows.

$$y = [y_1, y_2, \ldots, y_{N_R}]^T \quad \text{[Equation 6]}$$

If channels are modeled in the MIMO wireless communication system, the channels may be distinguished according to transmit/receive antenna indexes. A channel from the transmit antenna j to the receive antenna i is denoted by $h_{ij}$. In $h_{ij}$, it is noted that the indexes of the receive antennas precede the indexes of the transmit antennas in view of the order of indexes.

FIG. 5(b) is a diagram illustrating channels from the NT transmit antennas to the receive antenna i. The channels may be combined and expressed in the form of a vector and a matrix. In FIG. 5(b), the channels from the NT transmit antennas to the receive antenna i can be expressed as follows.

$$h_i^T = [h_{i1}, h_{i2}, \ldots, h_{iN_T}] \quad \text{[Equation 7]}$$

Accordingly, all channels from the NT transmit antennas to the NR receive antennas can be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \quad \text{[Equation 8]}$$

An AWGN (Additive White Gaussian Noise) is added to the actual channels after a channel matrix H. The AWGN $n_1, n_2, \ldots, n_{N_R}$ respectively added to the NR receive antennas can be expressed as follows.

$$n = [n_1, n_2, \ldots, n_{N_R}]^T \quad \text{[Equation 9]}$$

Through the above-described mathematical modeling, the received signals can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \quad \text{[Equation 10]}$$

$$Hx + n$$

Meanwhile, the number of rows and columns of the channel matrix H indicating the channel state is determined by the number of transmit and receive antennas. The number of rows of the channel matrix H is equal to the number NR of receive antennas and the number of columns thereof is equal to the number NR of transmit antennas. That is, the channel matrix H is an NR×NT matrix.

The rank of the matrix is defined by the smaller of the number of rows and the number of columns, which are independent from each other. Accordingly, the rank of the matrix is not greater than the number of rows or columns. The rank rank(H) of the channel matrix H is restricted as follows.

$$\text{rank}(H) \leq \min(N_T, N_R) \quad \text{[Equation 11]}$$

Additionally, the rank of a matrix can also be defined as the number of non-zero Eigen values when the matrix is Eigen-value-decomposed. Similarly, the rank of a matrix can be defined as the number of non-zero singular values when the matrix is singular-value-decomposed. Accordingly, the physical meaning of the rank of a channel matrix can be the maximum number of channels through which different pieces of information can be transmitted.

In this description, "rank" for MIMO transmission refers to the number of paths capable of independently transmitting a signal at a specific time and using specific frequency resources and the "number of layers" refers to the number of signal streams transmitted through each path. In general, since a transmission end transmits layers corresponding in number to the number of ranks used for signal transmission, the rank has the same meaning as the number of layers unless stated otherwise.

Initial Access Procedure

Figure 6:
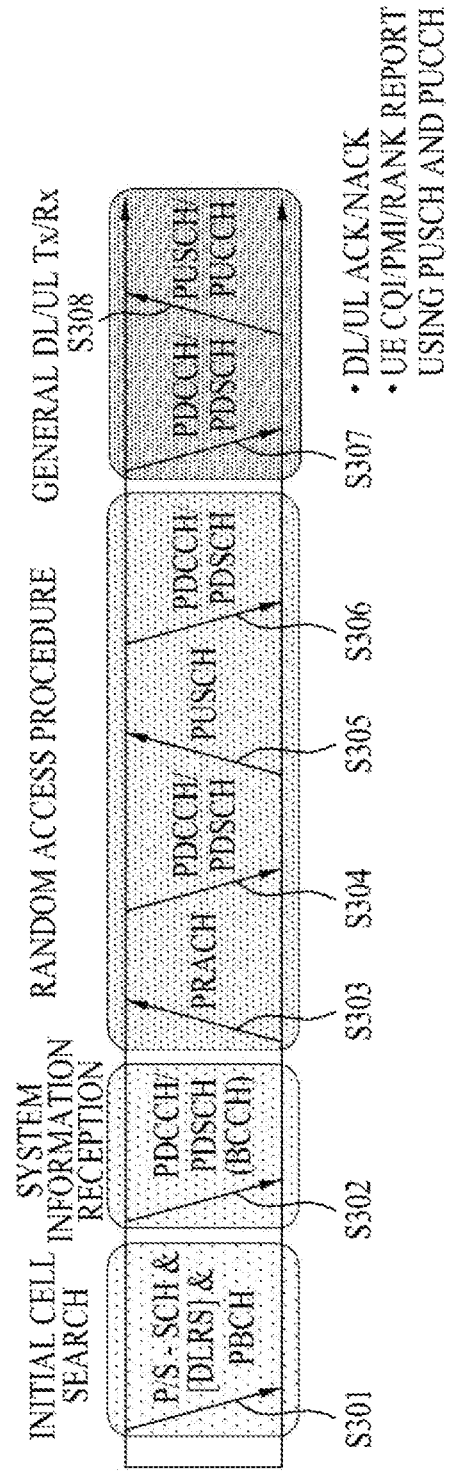
FIG. 6 is a diagram for explaining a signal transmission and reception method using an initial access procedure and physical channels used in the 3GPP system.

FIG. 6 is a diagram to describe an initial access procedure and signal transceiving method of a 3GPP system.

If a power of a UE is turned on or the UE newly enters a cell, the UE performs an initial cell search for matching synchronization with a base station and the like [S301]. To this end, the UE receives PSS and SSS from the base station, matches synchronization with the base station and then obtains information such as a cell ID and the like. Subsequently, the UE receives PBCH (physical broadcast channel) from the base station and is then able to obtain intra-cell broadcast information. Meanwhile, the UE receives a downlink reference signal (DL RS) in the initial cell searching step and is then able to check a downlink channel status.

Having completed the initial cell search, the UE receives a physical downlink control channel (PDCCH) and a physical downlink shared control channel (PDSCH) according to information carried on the physical downlink control channel (PDCCH) and is then able to obtain system information in further detail [S302].

Meanwhile, if the UE initially accesses the base station or fails to have a radio resource for signal transmission, the UE may perform a random access procedure (RACH) on the base station [steps S303 to S306]. To this end, the UE transmits a specific sequence as a preamble via a physical random access channel (PRACH) [S303, S305] and is then able to receive a response message via PDCCH and a corresponding PDSCH in response to the preamble [S304, S306]. In case of contention based RACH, a contention resolution procedure may be performed in addition.

Having performed the above mentioned procedures, the UE may perform PDCCH/PDSCH reception [S307] and PUSCH/PUCCH (physical uplink shared channel/physical uplink control channel) transmission [S308] as a general uplink/downlink signal transmission procedure. In particular, the UE receives a downlink control information (DCI) via PDCCH. In this case, the DCI includes such control information as resource allocation information on a UE and may differ in format in accordance with the purpose of its use.

Meanwhile, control informations transmitted to or received from the base station by the UE include DL/UL ACK/NACK signal, CQI (channel quality indicator), PMI (precoding matrix index), RI (rank indicator) and the like. In case of the 3GPP LTE system, the UE may transmit the above-mentioned control informations such as CQI, PMI, RI and the like via PUSCH and/or PUCCH.

MBMS (Multimedia Broadcast/Multicast Service)

In a wireless communication system such as 3GPP LTE, an LTE multimedia broadcast/multicast service (MBMS) is defined to efficiently provide broadcast and multicast services. The LTE MBMS applies a radio interface for transmitting broadcast and multicast data in a structure in which multiple cells operate like a single synchronized frequency network, i.e. in an MBSFN subframe. Meanwhile, MBSFN data is transmitted in correspondence to a physical multicast channel (PMCH) in terms of a physical layer. The PMCH recognizes an effective channel of a form in which channels of multiple cells are combined. Accordingly, an additional MBSFN reference signal (RS) for estimating the effective channel is transmitted through the PMCH.

In this case, presence of the PMCH and a PDSCH in the frequency domain in a specific subframe burdens a user equipment (UE) with simultaneous estimation of a cell-specific RS (CRS) based channel and an MBSFN RS based channel. To solve such a problem, the LTE system restricts transmission of the PDSCH in a subframe in which the PMCH is transmitted, referred to as an MBSFN subframe. Hence, the MBSFN subframe includes a downlink control region in a first or second OFDM symbol and the other region, i.e. the PMCH. While CRSs are transmitted in the control region, no CRSs are transmitted in the PMCH.

MBSFM subframes are semi-statically allocated according to a system information block (SIB) type 2 which is system information transmitted from higher layers. The system information may be updated at intervals of about twice or three times per hour. Accordingly, a transmission pattern of the MBSFM subframes may continue for a considerable time period. However, data for the MBMS is not always transmitted and partial resources among the allocated MBSFN subframes may not be used for the MBMS.

In LTE-A, a method for utilizing unused MBSFN subframes has been discussed and a method for transmitting unicast data for LTE-A UEs through the MBSFM subframe is proposed in consideration of the fact that legacy LTE UEs cannot expect that the unicast data will be transmitted in the MBSFM subframe.

Non-orthogonal Multiple Access (NOMA)

As one of methods for increasing system throughput and the like in a wireless communication system, Non-Orthogonal Multiple Access (hereinafter abbreviated 'NOMA') operation is considered. In an existing OFDMA system, a resource is allocated per UE in frequency-time domain. Yet, in a NOMA system, on the assumption that an interference cancellation receiver is used, a plurality of UEs are assigned to the same frequency-time resource based on a previously determined power ratio. Namely, NOMA means a multiple access scheme capable of improving bandwidth efficiency in a manner of cancelling previously considered inter-user interference through the interference cancellation receiver, and is mentioned as a technology candidate of the future 5G system.

Regarding terms used in the following, NOMA constellation may be referred to as combined constellation, superposed constellation, or composite constellation. Constellation may be expressed as a constellation map type or a table type (e.g., a modulation mapping table) of mapping an IQ value and a bit sequence to each other. A constellation point may be referred to as a modulated symbol, a complex symbol, or an IQ value (i.e., I+jQ).

Figure 7:
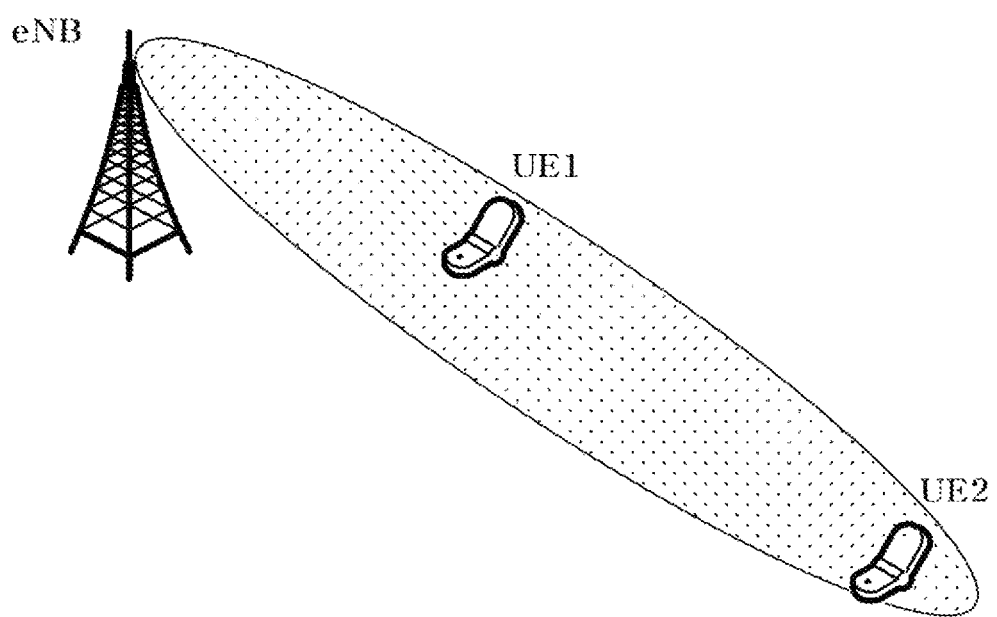
FIG. 7 illustrates an exemplary NOMA environment according to an embodiment of the present invention.

FIG. 7 shows one example of a NOMA environment according to one embodiment of the present invention.

An eNB can configure a NOMA pair with a multitude of UEs. In FIG. 7, for clarity, it is assumed that 2 UEs UE1 and UE2 configure a NOMA pair. And, it is not excluded that more UEs configure a NOMA pair or group. An eNB sets a different Tx power per UE belonging to a NOMA pair and is able to use a method of sending modulated symbols by superposing the modulated symbols of the respective UEs. In FIG. 7, a relatively small transmit power is set for the UE 1 and a relatively large power is set for the UE 2.

Figure 8:
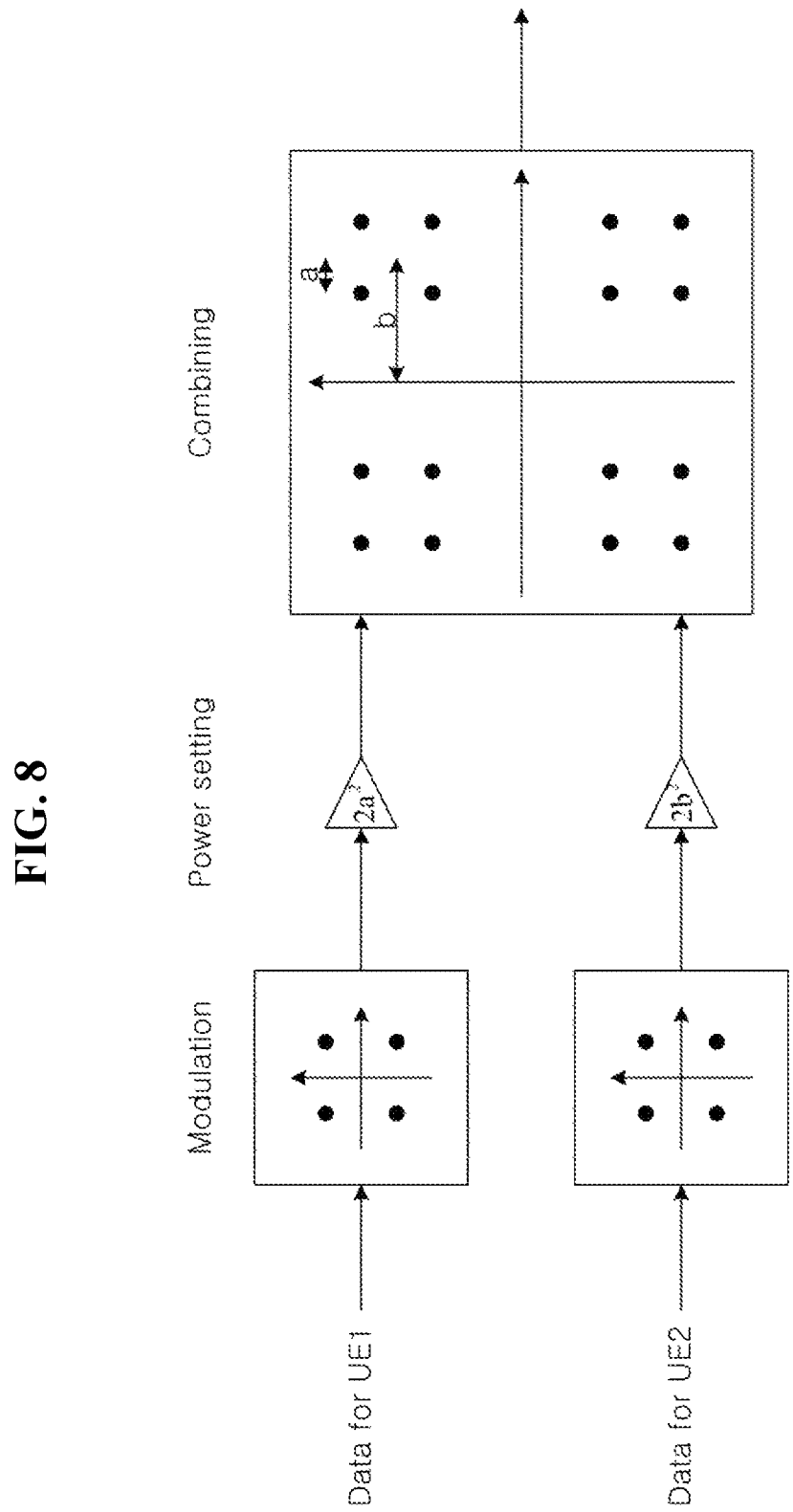
FIG. 8 illustrates an exemplary NOMA transmission operation.

FIG. 8 shows one example of an operation for NOMA transmission.

In FIG. 8, assume that a QPSK modulation scheme is used by each of UE1 and UE2. Referring to FIG. 8, an eNB performs QPSK modulation on an information sequence for each of the UE1 and the UE2. The eNB sets a transmit power corresponding to each UE (b>a) and then performs a transmission by superposing signals of the respective UEs on each other.

Having received the signal generated through the process shown in FIG. 8, the UE2 can perform a receiving operation by regarding the signal of the UE1 as noise. Namely, if a difference between a power of the signal for the UE1 and a power of the signal for the UE2 is considerably big, as the signal for the UE1 can be regarded as noise, the UE2 can receive a signal of its own in a manner identical to an existing manner.

On the other hand, in aspect of the UE1, since a power of the UE2 signal is relatively large, if the UE1 performs a receiving operation in a manner identical to an existing manner, demodulation performance may be considerably reduced. Hence, cancellation for the UE2 signal or a reception algorithm conforming to such cancellation. For the elimination or cancellation of the UE2 signal, the eNB can send information on the UE2 signal to the UE1. The UE1 should perform modulation in consideration of a UE2 signal having a relatively large power using the same resource (e.g., time, frequency, space, etc.).

A content contained in the information on the UE2 signal may be determined depending on a type (e.g., ML (maximum likelihood) receiver, SIC (successive interference cancellation) receiver, NOMA reception algorithm of UE1) of a receiver of the UE1.

(i) One example of a joint ML receiver is a method of estimating a closest constellation point as a transmitted signal by calculating a distance between a received signal and each point of a combined constellation of superposed constellations of respective UEs. The joint ML receiver can be implemented by a modulated symbol unit or a bit unit.

(ii) An SIC receiver uses a method of generating an interference signal on the basis of detailed information on interference, eliminating the interference signal from a received signal, and then demodulating its signal. The SIC receiver may be implemented on a symbol level, a codeword level or the like. Symbol-level SIC means a scheme of eliminating a modulated symbol of an interference signal from a received symbol by processing the interference signal up to a modulated symbol level only. Hence, in the symbol-level SIC, decoding of an interference signal is not performed but decoding can be performed on a signal of its own only. Codeword-level SIC obtains an information bit sequence (i.e., codeword) by performing decoding on an interference signal as well as demodulation. Thereafter, the codeword-level SIC encodes and modulates the information bit sequence again (e.g., encoding and modulating a codeword like a transmitter). The codeword-level SIC obtains a signal of its own by eliminating a signal, which results from multiplying a modulated symbol generated from a modulation result by an estimated channel component, from a received signal.

NOMA Operation for MBMS

Based on the aforementioned discussion, a method of sending an MBMS (multimedia broadcast/multicast service) signal based on a NOMA operation is described as follows.

NOMA is usable for a transmission of a multicast/broadcast signal as well as a unicast signal. For example, NOMA may be usable for MBMS data transmission defined in LTE. MBMS data is transmitted by single frequency network (SFN) scheme in order to meet the requirements in LTE and is referred to as MBSFN (multicast broadcast single frequency network). In a wireless communication system, a single frequency network (SFN) means a technique for a multitude of transmitters to send the same data on the same resource. In receiving signals sent by SFN scheme from a multitude of transmitters, a receiver may recognize the signals as a signal delayed by multipath. Hence, as signal coverage may increase and the same resource is used, efficiency of resource use can be improved. In MBSFN defined in an existing LTE system, base stations operate in a manner of exchanging transmission timing (e.g., MBSFN subframe), transmission data (e.g., MBMS data) and the like through backhaul communication and sending the corresponding data at the same timing. MBMS data is transmitted on physical multicast channel (PMCH).

In the following, methods for applying NOMA to PMCH carrying MBMS data are described. In the following description, assume that MBMS signal carried on PMCH is divided into a basic layer (BL) and an enhanced layer (EL). Here, a layer can be understood as a transmission layer to which a transmitted symbol is mapped and have a meaning different from that of such a layer as a physical layer, a MAC layer, an RRC layer or the like, which can be understood by those skilled in the art.

EL data may include additional information on BL data. For example, in case of additional information, if BL data is a video or image file of specific resolution, EL data may be additional information capable of raising resolution of the BL data. For example, a UE receiving a video or audio service through MBMS can improve the resolution of video or audio by further receiving an enhanced layer in comparison with a case of receiving a basic layer only.

On the other hand, data different from BL data may be assigned to EL data. For example, in order to provide different services, EL data and BL data may be transmitted by being independently generated.

EL data may be referred to as an EL signal. BL data may be referred to as a BL signal. Since EL data and BL data are transmitted on PMCH, the PMCH may mean EL+BL data, EL data or BL data.

According to one embodiment of the present invention, a NOMA operation on PMCH may include an operation of multiplexing BL and EL in a power domain. For example, assume that a high power and a low power are assigned to BL and EL, respectively. Namely, a base station can multiplex different signals (e.g., MBMS signal) having different transmit powers on the same resources. In case of attempting to receive a high power signal (e.g., BL), a UE performs a receiving operation by an existing scheme. In case of attempting to receive a low power signal (e.g., EL), a UE performs cancellation on a high power signal and then performs a receiving operation on the high power signal.

Figure 9:
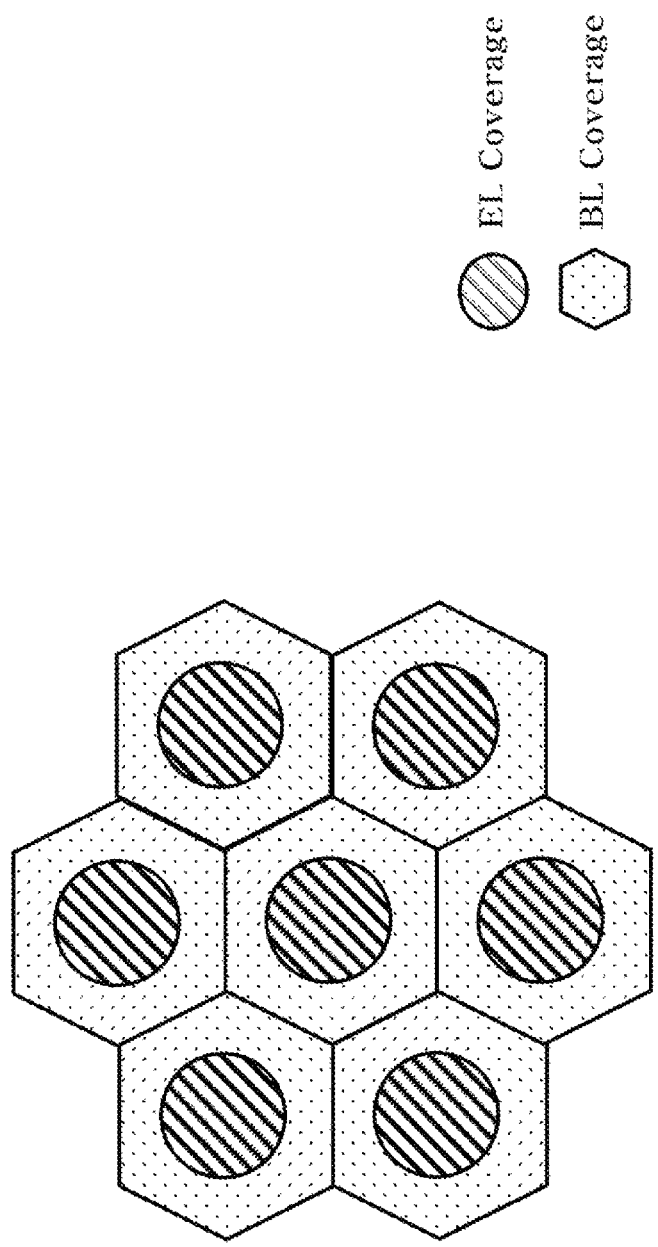
FIG. 9 shows one example of the coverage of BL and EL according to one embodiment of the present invention.

FIG. 9 shows one example of the coverage of BL and EL according to one embodiment of the present invention. For example, a NOMA operation between PMCH of EL and PMCH of BL may have the coverage shown in FIG. 9, by which the present invention is non-limited.

Referring to FIG. 9, a coverage of BL includes a coverage of EL. Namely, the BL coverage transmitted with relatively high power can cover all EL coverage transmitted with relatively low power.

In case that 7 cells configure 1 MBSFN area, as shown in FIG. 9, synchronization of cells belonging to the same MBSFN area can be assumed as matched. Hence, the coverage of BL extends to the whole MBSFN area in FIG. 9. For example, if a multitude of cells having the same synchronization send the same BL signal on the same resource (i.e., SFN), the individual coverages of the respective cells can be regarded as if they are a single BL coverage.

On the other hand, since EL is transmitted with a low power, there may be no gain according to SFN. For example, in case of EL transmitted with a low power, since a coverage is small, it is unable to cover a cell boundary area and an EL coverage shadow may be generated from a boundary area between cells. Hence, although a multitude of synchronized cells transmit EL data on the same resource, a shadow zone at which an EL signal of any cell cannot arrive may be generated. Hence, in case of EL, it is difficult to secure a gain of SFN transmission. In order to obtain SFN gain from EL data transmission/reception, EL should be transmitted with a high power like BL. In this case, since a power difference between the EL and the BL is reduced, a NOMA gain may be lowered considerably. Namely, in order to smoothly perform a NOMA operation, a sufficient power difference is necessary to enable an EL signal and a BL signal, which are different from each other, to be clearly distinguished from each other in a power domain. If the EL signal and the BL signal has equivalent powers, respectively, since both sides cannot be distinguished from each other in the power domain, it is difficult to perform a NOM operation correctly.

Power Assignment for PMCH NOMA

Referring to 3GPP TS36.213 document, a power difference between RS and data in an existing PMCH is defined as follows. "For PMCH with 16QAM, 64QAM and 256QAM, the UE may assume that the ratio of PMCH EPRE to MBSFN RS EPRE is equal to 0 dB".

This means that in 16 QAM, 64 QAM, 256 QAM except QPSK, MBSFN RS and PMCH are transmitted with the substantially equal power. Yet, in case of QPSK, since demodulation can be performed using a phase of a received symbol only, the relation for a size of power is not separately defined.

As described above, a UE performing a NOMA operation can cancel BL data detected from a whole received signal and then perform demodulation on EL data (e.g. codeword-level SIC, symbol-level SIC). Moreover, a UE performing a NOMA operation can receive BL and EL data by performing ML detection based on composite constellation in consideration of both BL and EL.

Figure 10:
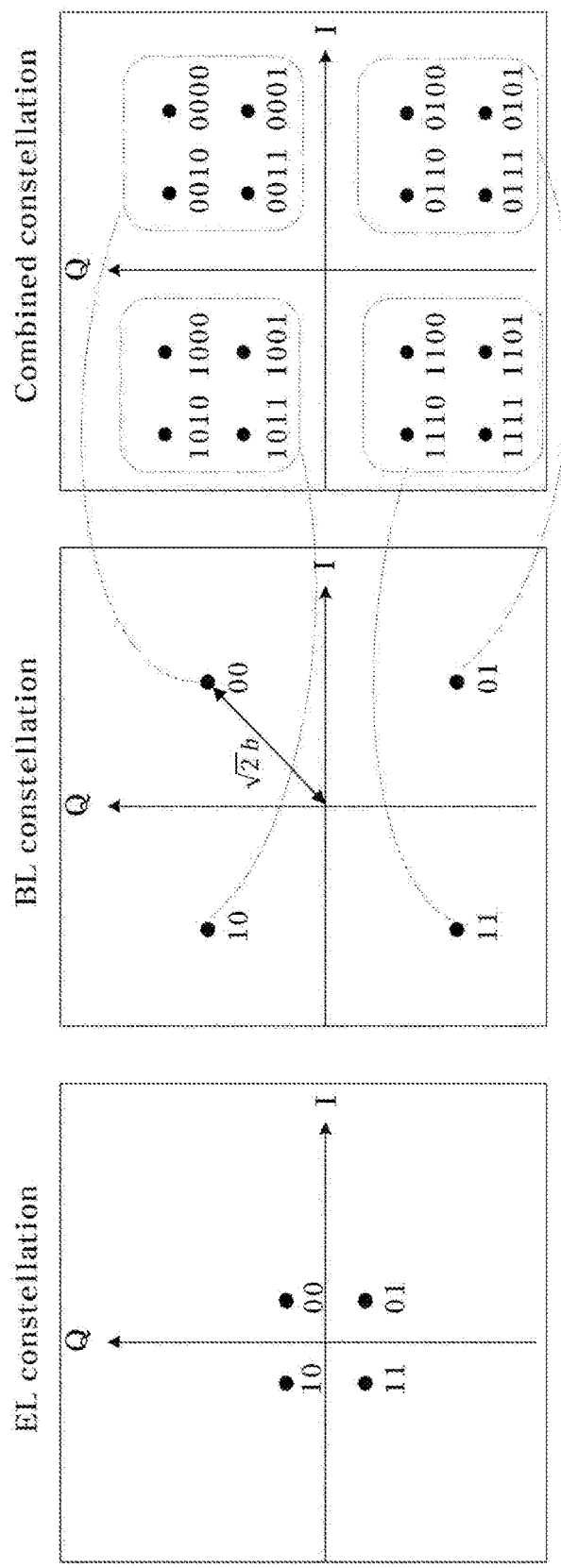
FIG. 10 shows one example of combined constellation of BL and EL constellations.

FIG. 10 shows one example of combined constellation of BL and EL constellations. For clarity, assume that QPSK modulation scheme is used for both BL and EL. Each bit sequence mapped to the combined constellation shown in the drawing is one example for clarity of description, by which the present invention is non-limited. Similarly to FIG. 8, a power of EL is assumed as corresponding to $2a^2$ and a power of BL is assumed as corresponding to $2b^2$. Although FIG. 10 shows one example that a combined constellation is configured by a simple combination of EL and BL, an additional function may be added to apply a gray mapping between adjacent symbols of a composite constellation for the purpose of performance improvement and the like.

In a combined constellation, each quadrant means a constellation point of BL. For example, 4 points (i.e., '0000', '0010', '0011', '0001') located in a first quadrant of a combined constellation correspond to '00' of a BL constellation. Moreover, 4 points located in a second quadrant of the combined constellation correspond to '10' of the BL constellation.

Moreover, '0000' among the 4 points located in the first quadrant corresponds to '00' of the EL constellation, '0010' corresponds to '10' of the EL constellation, '0011' corresponds to '11' of the EL constellation, and '0001' corresponds to '01' of the EL constellation. Namely, if 4 points located in the first quadrant are shifted by $\sqrt{2}b$ of a complex symbol by considering the power $2b^2$ of BL, the shifted 4 points correspond to 4 points of the EL constellation.

In order to enable the NOMA reception schemes to operate correctly, a UE should be aware of accurate power assignment information on both EL data and BL data. For example, when a modulation order of EL data in an SIC receiver is greater than 2 (i.e., QPSK), if a power configuration of BL data is inaccurate, reception performance of EL data can be considerably reduced. Namely, when a UE needs to cancel BL data from a whole received signal in consideration of a power of the BL data, if the BL data is cancelled excessively in comparison with a real power of the BL data or cancelled excessively smaller than the real power of the BL data, demodulation/decoding of the EL data cannot be performed correctly.

FIG. 11 shows one example of BL data cancellation. For clarity, the same assumption of FIG. 10 applies to FIG. 11. A NOMA symbol sent by a base station is assumed as '0000', a BL symbol is assumed as '00', and an EL symbol is assumed as '00'.

$X_1$ indicates a NOMA symbol received by a UE. Since $X_1$ is located in a first quadrant, the UE can recognize that BL symbol is '00'. Thereafter, the UE should cancel BL data in consideration of a power of the BL data.

When a power value $2b^2$ of BL is correctly set for the UE, if the UE cancels the power of the BL in a power domain, $X_1$ is shifted to a location $X_2$. Thereafter, the UE determines that a constellation point '00' closest to the location $X_2$ in an EL constellation is an EL transmitted symbol. Thus, the UE can correctly obtain both of the transmitted symbol '00' of the BL and the transmitted symbol '00' of the EL.

On the other hand, assume a case that a power value of BL is set excessively large for the UE. For example, when the UE assumes that a power value of the BL is $8b^2$ (if a power value of BL set by an eNB is $2b^2$), if the UE cancels a power of the BL in a power domain, $X_1$ is shifted to a location $X_3$. The UE then determines that a constellation point '11' closest to the location $X_3$ in the EL constellation is an EL transmitted symbol. Eventually, although the UE can correctly obtain the transmitted symbol '00' of the BL, it determines the transmitted symbol of the EL as '11' incorrectly. Since the UE uses the incorrectly determined transmitted symbol of the EL, MBMS reception is degraded and MBMS quality gets worse than that in case of using BL only. Namely, the EL works as noise.

Although QPSK is exemplarily shown in FIG. 11 for clarity, when 16 QAM, 64 QAM or 256 QAM is used, it is apparent to those skilled in the art that accuracy of a BL power value becomes more important than that in case of QPSK.

Meanwhile, since PMCH can be received by a legacy UE (i.e., a UE not supporting NOMA), 'a ratio between PMCH EPRE and MBSFN RS EPRE is 0 dB', which is the existing specifications for power of BL data receivable by the legacy UE, is preferably maintained. Hence, an advanced UE (i.e., a UE supportive of NOMA) capable of further receiving EL data can assume power assignments to each layer of PMCH and RS as follows.

Option 1: A UE can assume that energies or powers of MBSFN RS and PMCH BL are equal to each other for all modulation orders including QPSK. This can be interpreted as 'UE can assume that a ratio between EPRE of PMCH BL having modulation of QPSK, 16 QAM, 64 QAM, or 256 QAM and EPRE of MBSFN RS is 0 dB.'

Option 2: When a modulation order of PMCH BL is 16 QAM, 64 QAM, or 256 QAM, a UE assumes that a ratio between EPRE of MBSFN and EPRE of PMCH BL is 0 dB. And, in case that a modulation order of PMCH BL is QPSK, a ratio between EPRE of MBSFN and EPRE of PMCH BL may be defined in advance or indicated by upper layer signaling.

Power Offset Between BL and EL for PMCH NOMA

As described above, PMCH can be transmitted by SFN scheme, which means that a signal transmitted from an adjacent cell (e.g., an adjacent cell included in a same MBSFN area) and a signal transmitted from a serving cell are received together.

When a base station applies a NOMA operation to PMCH and sets a big power difference between BL and EL to secure a NOMA gain, it may happen that EL data fails to correspond to SFN despite that BL data corresponds to SFN.

Figure 12:
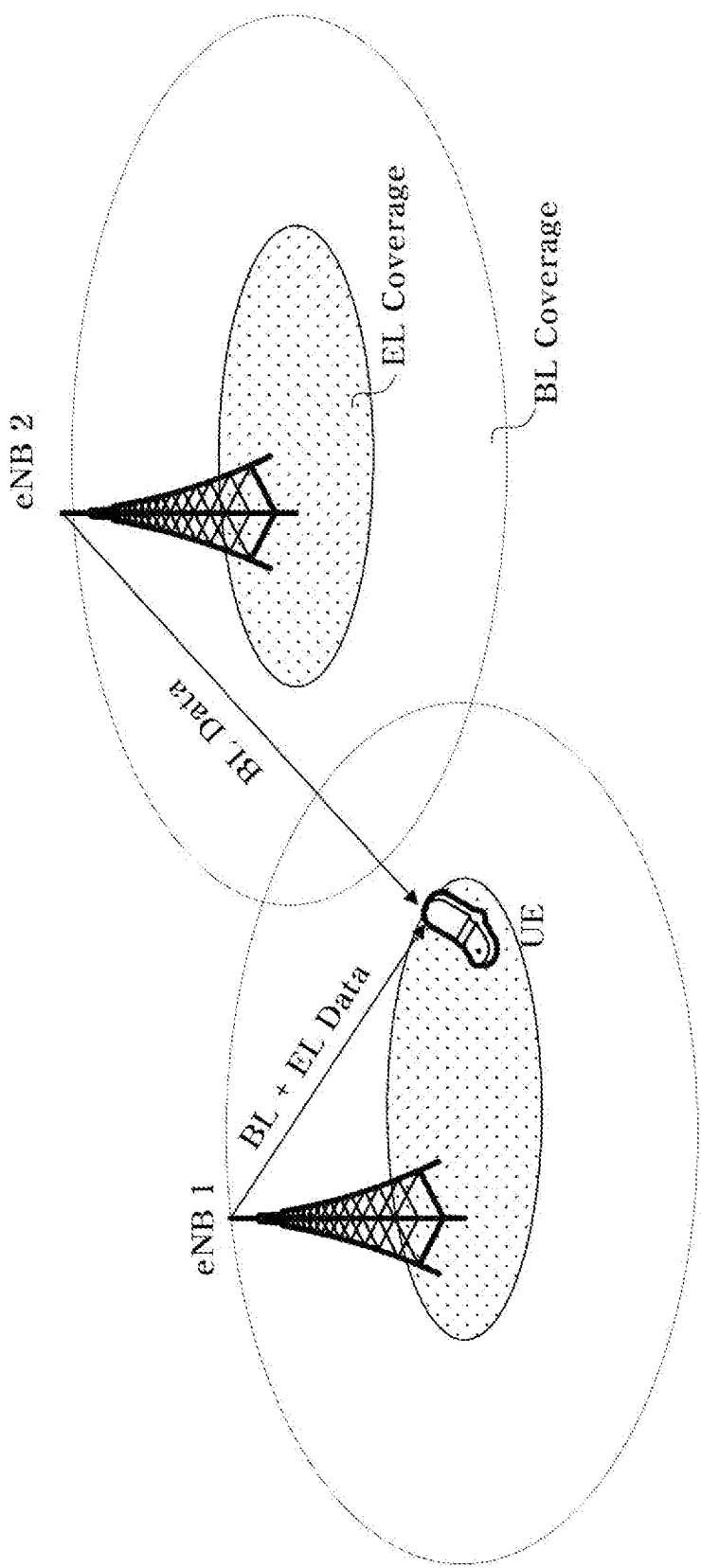
FIG. 12 shows one example of applying a NOMA operation to PMCH.

FIG. 12 shows one example of applying a NOMA operation to PMCH.

Referring to FIG. 12, a UE receives PMCH having a NOMA operation applied thereto from two cells (e.g., eNB 1 and eNB 2) within an MBSFN area, thereby obtaining EL/BL data. a UE located within EL coverage of a serving cell can receive both BL data and EL data from the serving cell (e.g., eNB 1). Yet, the UE can receive BL data only from an adjacent cell (e.g., eNB 2). Thus, if a UE receives a signal of a prescribed layer only from an adjacent cell by SFN scheme, a problem may be caused to reception performance.

For example, for a NOMA operation, a UE can receive a signaling of power offsets of EL and BL in advance. Yet, in case of FIG. 12, a power offset of an actually received signal may appear different from a signaled value due to a BL signal received from an adjacent cell. As described above, this may work as a cause of reducing reception performance of an SIC or ML receiver. Namely, since a UE receives BL signal from 2 cells (i.e., SFN), an actual power difference between BL and EL received by the UE may appear greater than a power offset between BL and EL set for the UE in advance.

To solve such a problem, the present invention proposes to perform a nulling on a specific resource when a serving cell transmits PMCH. Here, the nulling may be interpreted as the serving cell does not transmit data on the corresponding resource.

Such a resource nulling may be indicated through upper layer signaling and the like. For example, a nulled resource can be signaled in a manner of combining a subframe or a subframe set in a time domain or PRB pair set(s) and/or RE(s) unit and the like in a frequency domain. For example, a nulling may be performed in a specific subframe (set) among subframes belonging to MBSFN subframe set or a specific RE (set) of all MBSFN subframes.

A nulled resource may be used for each UE of a corresponding cell to measure a power of a signal (e.g., BL signal) through SFN from an adjacent cell within MBSFN area. Having derived a power of a signal received from an adjacent cell except a serving cell, a UE can classify EL and BL powers transmitted by a serving cell on a resource, on which a signal is transmitted by the serving cell, and BL power transmitted by an adjacent cell. Based on a power offset between EL and BL signaled in advance from the serving cell, the UE can use a receiver of SIC, ML or the like.

For example, if a location of a nulled resource is set for a UE by a serving cell, the UE measures a power value P1 of a BL signal transmitted on the nulled resource by an adjacent cell. Moreover, by adding the measured value P1 to a previously set power offset P2, the UE can determine that a power difference between BL and EL in an actually received NOMA signal amounts to (P1+P2). Thereafter, by cancelling a power of BL on the basis of the power difference (P1+P2) between BL and EL, the UE can correctly receive EL.

For example, a serving cell can send a signaling to UEs within the serving cell in advance to announce that MBSFN RS of a specific location is nulled. Or, the serving cell may inform a UE that a specific PMCH RE is nulled by specifying it in advance. And, the UE can assume that data (of BL and EL of the serving cell) are punctured on the nulled PMCH RE.

As described above, in order for a UE to correctly receive EL, the UE should be accurately aware of a power of BL and a power of EL in a whole reception power. According to an embodiment of signaling a power offset, a UE can accurately determine a power of EL and demodulate and decode EL correctly based on the power of the EL. For example, although the UE can obtain a power of the BL through a predefined ratio between EPRE of PMCH BL and EPRE of MBSFN RS, how to define a power of EL may become a problem. The UE may simply assume that the rest of a whole reception power except the BL power is EL power. Yet, since a power of EL is relatively small, it may be considerably affected by a noise power. Hence, the UE may be able to estimate EL power from BL power more accurately. Namely, the UE may estimate EL power from BL power using a power offset between BL and EL and a nulled RE. particularly, if EL is modulated based on 16 QAM, 64 QAM or 256 QAM, it is more important to estimate EL power accurately by excluding noise.

Figure 13:
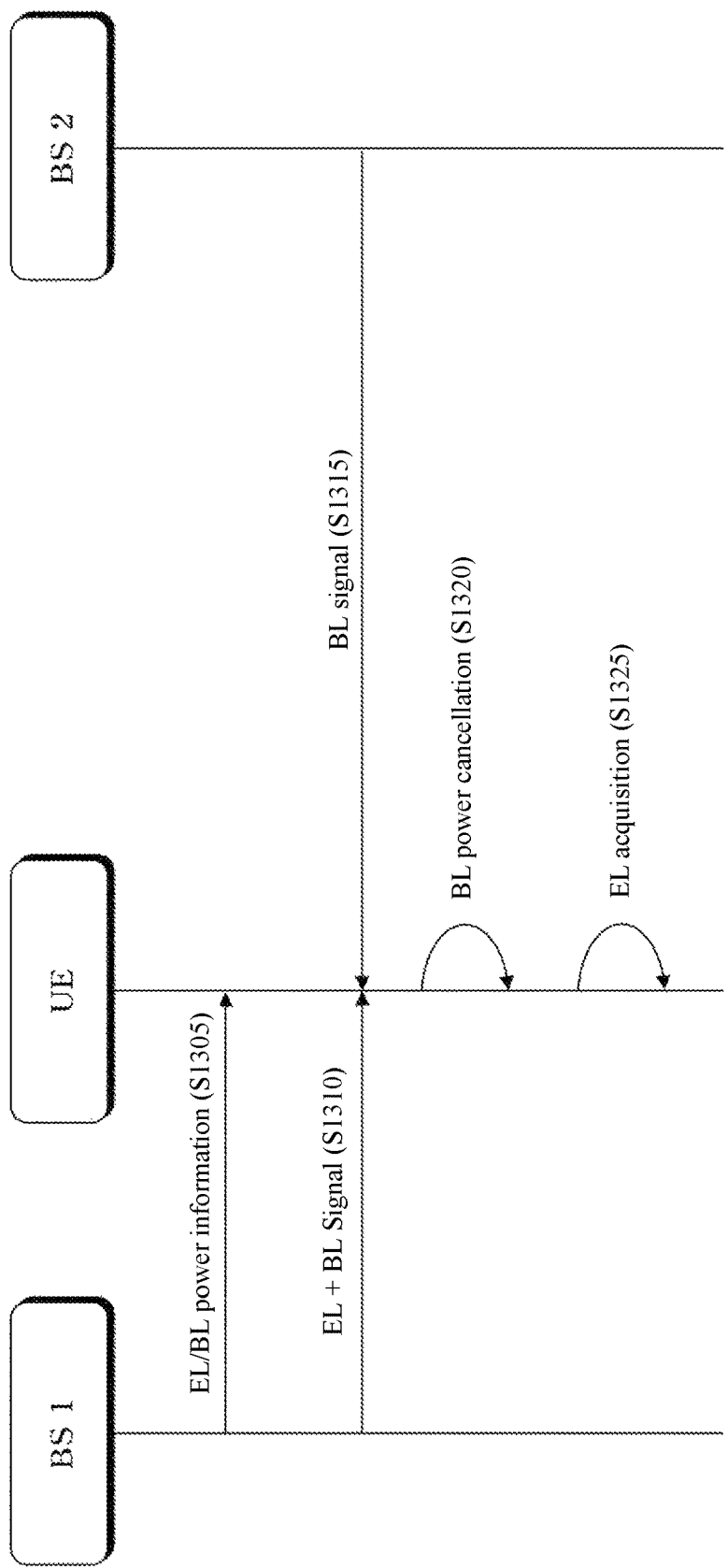
FIG. 13 shows a flow of a method of transceiving an MBMS signal according to one embodiment of the present invention.

FIG. 13 shows a flow of a method of transceiving an MBMS signal according to one embodiment of the present invention. The substance redundant with the former description may be omitted. BS 1 and BS 2 are assumed as a serving cell and a neighbor cell, respectively. And, the serving cell and the neighbor cell are assumed as belonging to the same MBSFN area.

Referring to FIG. 13, a UE receives EL/BL power information from a serving cell [S1305]. The EL/BL power information may include a power ratio between EL and BL or a power offset between EL and BL.

The UE may receive information on a nulled resource on which the serving cell does not perform transmission. For example, through a nulled resource on which the serving cell does not perform transmission of a basic MBMS layer, the UE can measure a power of the basic MBMS layer transmitted by a neighbor cell.

The UE receives an MBMS signal including a basic MBMS layer and an enhanced MBMS layer multiplexed within different power values in a power domain [S1310, S1315]. In doing so, although the basic MBMS layer is received from the serving cell and the neighbor cell by single frequency network (SFN) scheme, the enhanced MBMS layer may be received from the serving cell except the neighbor cell.

The UE cancels the power of the basic MBMS layer from the received MBMS signal [S1320], thereby obtaining the enhanced MBMS layer [S1325]. For example, the UE can cancel the power of the basic MBMS layer and then demodulate and decode the enhanced MBMS layer.

The UE can assume that a ratio between energy per resource element (EPRE) of a power of a basic MBMS layer and EPRE of an multimedia broadcast single frequency network (MBSFN) reference signal is 0 dB.

The basic MBMS layer power cancelled from the NOMA signal may include the power of the basic MBMS layer received from the serving cell and the power of the basic MBMS layer received from the neighbor cell. For example, the UE can correct the power offset between the basic MBMS layer and the enhanced MBMS layer signaled from the serving cell based on the power of the basic MBMS layer received from the neighbor cell.

A power higher than that of the enhanced MBMS layer may be assigned to the basic MBMS layer. The UE may obtain the basic MBMS layer from the MBMS signal by assuming the power of the enhanced MBMS layer as nose. For example, the UE can improve a quality of a multimedia content provided through the basic MBMS layer using the enhanced MBMS layer.

The MBMS layer can be received through physical multicast channel (PMCH).

Figure 14:
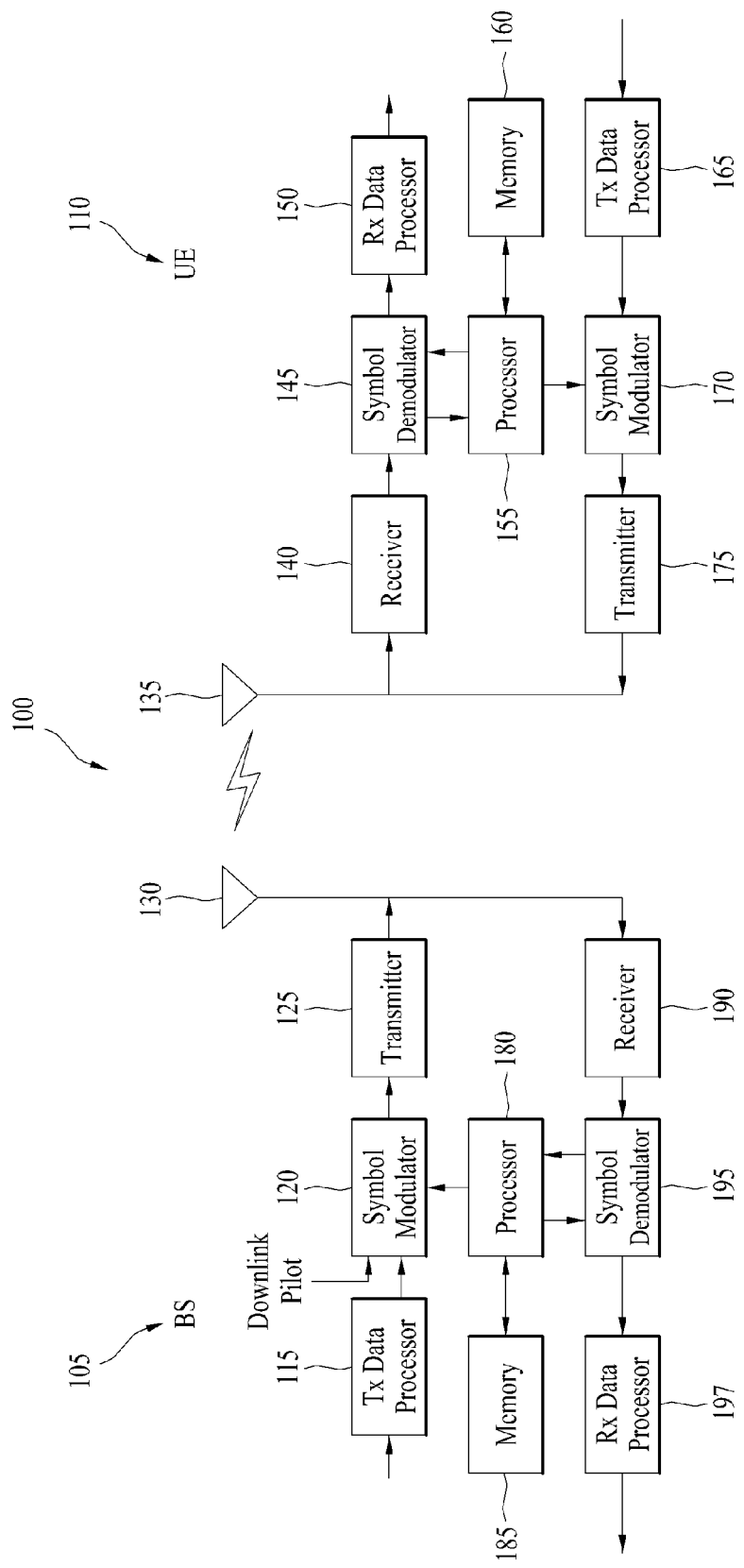
FIG. 14 shows configurations of a base station and user equipment applicable to an embodiment of the present invention.

FIG. 14 is a block diagram illustrating a base station (BS) 105 and a user equipment (UE) 110 for use in a wireless communication system 100 according to the present invention. The BS and the UE of FIG. 14 may perform the operations of aforementioned embodiments.

Referring to FIG. 14, the BS 105 may include a transmission (Tx) data processor 115, a symbol modulator 120, a transmitter 125, a transmission/reception antenna 130, a processor 180, a memory 185, a receiver 190, a symbol demodulator 195, and a reception (Rx) data processor 197. The UE 110 may include a Tx data processor 165, a symbol modulator 170, a transmitter 175, a transmission/reception antenna 135, a processor 155, a memory 160, a receiver 140, a symbol demodulator 155, and an Rx data processor 150. In FIG. 12, although one antenna 130 is used for the BS 105 and one antenna 135 is used for the UE 110, each of the BS 105 and the UE 110 may also include a plurality of antennas as necessary. Therefore, the BS 105 and the UE 110 according to the present invention support a Multiple Input Multiple Output (MIMO) system. The BS 105 according to the present invention can support both a Single User-MIMO (SU-MIMO) scheme and a Multi User-MIMO (MU-MIMO) scheme.

In downlink, the Tx data processor 115 receives traffic data, formats the received traffic data, codes the formatted traffic data, interleaves the coded traffic data, and modulates the interleaved data (or performs symbol mapping upon the interleaved data), such that it provides modulation symbols (i.e., data symbols). The symbol modulator 120 receives and processes the data symbols and pilot symbols, such that it provides a stream of symbols.

The symbol modulator 120 multiplexes data and pilot symbols, and transmits the multiplexed data and pilot symbols to the transmitter 125. In this case, each transmission (Tx) symbol may be a data symbol, a pilot symbol, or a value of a zero signal (null signal). In each symbol period, pilot symbols may be successively transmitted during each symbol period. The pilot symbols may be an FDM symbol, an OFDM symbol, a Time Division Multiplexing (TDM) symbol, or a Code Division Multiplexing (CDM) symbol.

The transmitter 125 receives a stream of symbols, converts the received symbols into one or more analog signals, and additionally adjusts the one or more analog signals (e.g., amplification, filtering, and frequency upconversion of the analog signals), such that it generates a downlink signal appropriate for data transmission through an RF channel. Subsequently, the downlink signal is transmitted to the UE through the antenna 130.

Configuration of the UE 110 will hereinafter be described in detail. The antenna 135 of the UE 110 receives a DL signal from the BS 105, and transmits the DL signal to the receiver 140. The receiver 140 performs adjustment (e.g., filtering, amplification, and frequency downconversion) of the received DL signal, and digitizes the adjusted signal to obtain samples. The symbol demodulator 145 demodulates the received pilot symbols, and provides the demodulated result to the processor 155 to perform channel estimation.

The symbol demodulator 145 receives a frequency response estimation value for downlink from the processor 155, demodulates the received data symbols, obtains data symbol estimation values (indicating estimation values of the transmitted data symbols), and provides the data symbol estimation values to the Rx data processor 150. The Rx data processor 150 performs demodulation (i.e., symbol-demapping) of data symbol estimation values, deinterleaves the demodulated result, decodes the deinterleaved result, and recovers the transmitted traffic data.

The processing of the symbol demodulator 145 and the Rx data processor 150 is complementary to that of the symbol modulator 120 and the Tx data processor 115 in the BS 205.

The Tx data processor 165 of the UE 110 processes traffic data in uplink, and provides data symbols. The symbol modulator 170 receives and multiplexes data symbols, and modulates the multiplexed data symbols, such that it can provide a stream of symbols to the transmitter 175. The transmitter 175 receives and processes the stream of symbols to generate an uplink (UL) signal, and the UL signal is transmitted to the BS 105 through the antenna 135.

The BS 105 receives the UL signal from the UE 110 through the antenna 130. The receiver processes the received UL signal to obtain samples. Subsequently, the symbol demodulator 195 processes the symbols, and provides pilot symbols and data symbol estimation values received via uplink. The Rx data processor 197 processes the data symbol estimation value, and recovers traffic data received from the UE 110.

A processor 155 or 180 of the UE 110 or the BS 105 commands or indicates operations of the UE 110 or the BS 105. For example, the processor 155 or 180 of the UE 110 or the BS 105 controls, adjusts, and manages operations of the UE 210 or the BS 105. Each processor 155 or 180 may be connected to a memory unit 160 or 185 for storing program code and data. The memory 160 or 185 is connected to the processor 155 or 180, such that it can store the operating system, applications, and general files.

The processor 155 or 180 may also be referred to as a controller, a microcontroller), a microprocessor, a microcomputer, etc. In the meantime, the processor 155 or 180 may be implemented by various means, for example, hardware, firmware, software, or a combination thereof. In a hardware configuration, methods according to the embodiments of the present invention may be implemented by the processor 155 or 180, for example, one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, methods according to the embodiments of the present invention may be implemented in the form of modules, procedures, functions, etc. which perform the above-described functions or operations. Firmware or software implemented in the present invention may be contained in the processor 155 or 180 or the memory unit 160 or 185, such that it can be driven by the processor 155 or 180.

Radio interface protocol layers among the UE 110, the BS 105, and a wireless communication system (i.e., network) can be classified into a first layer (L1 layer), a second layer (L2 layer) and a third layer (L3 layer) on the basis of the lower three layers of the Open System Interconnection (OSI) reference model widely known in communication systems. A physical layer belonging to the first layer (L1) provides an information transfer service through a physical channel. A Radio Resource Control (RRC) layer belonging to the third layer (L3) controls radio resources between the UE and the network. The UE 110 and the BS 105 may exchange RRC messages with each other through the wireless communication network and the RRC layer.

In the present specification, the processor 155 of the UE and the processor 180 of the base station perform operations of processing signals and data except functions for the UE 110 and the base station 105 to receive, transmit and store signals, respectively. Yet, for clarity, the processors 155 and 180 are not mentioned especially. Although the processors 155 and 180 are not mentioned especially, they can be regarded as performing a series of operations (e.g., data processing, etc.) other than the signal receiving, transmitting, and storing functions.

The above-mentioned embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

The embodiments of the present invention mentioned in the foregoing description are applicable to various kinds of mobile communication systems.

What is claimed is:

1. A method of receiving a multimedia broadcast multicast service (MBMS) signal by a user equipment based on a non-orthogonal multiple access (NOMA) operation in a wireless communication system, the method comprising:
    receiving an MBMS signal including a basic MBMS layer and an enhanced MBMS layer which are multiplexed with different power values in a power domain; and
    obtaining the enhanced MBMS layer by cancelling a power of the basic MBMS layer from the received MBMS signal,
    wherein the basic MBMS layer is received from a serving cell and a neighbor cell by a single frequency network (SFN) scheme and
    wherein the enhanced MBMS layer is received from the serving cell, except the neighbor cell.

2. The method of claim 1, wherein the user equipment assumes that a ratio between an energy per resource element (EPRE) of the power of the basic MBMS layer and an EPRE of a multimedia broadcast single frequency network (MBSFN) reference signal is 0 dB.

3. The method of claim 1, wherein the power of the basic MBMS layer canceled from the MBMS signal includes the power of the basic MBMS layer received from the serving cell and the power of the basic MBMS layer received from the neighbor cell.

4. The method of claim 3, wherein the user equipment measures the power of the basic MBMS layer transmitted by the neighbor cell through a nulled resource on which the serving cell does not perform the transmission of the basic MBMS layer.

5. The method of claim 3, wherein the user equipment corrects a power offset between the basic MBMS layer and the enhanced MBMS layer signaled from the serving cell based on the power of the basic MBMS layer received from the neighbor cell.

6. The method of claim 1,
    wherein a power higher than that of the enhanced MBMS layer is assigned to the basic MBMS layer and
    wherein the user equipment obtains the basic MBMS layer from the MBMS signal by assuming the power of the enhanced MBMS layer as a noise.

7. The method of claim 6, wherein the user equipment improves a quality of a multimedia content provided through the basic MBMS layer using the enhanced MBMS layer.

8. The method of claim 1,
    wherein the MBMS signal is received through a physical multicast channel (PMCH) and
    wherein the serving cell and the neighbor cell belong to a same multimedia broadcast single frequency network (MBSFN) area.

9. A user equipment for receiving a multimedia broadcast multicast service (MBMS) signal based on a non-orthogonal multiple access (NOMA) operation in a wireless communication system, the user equipment comprising:
    a receiver configured to receive the MBMS signal including a basic MBMS layer and an enhanced MBMS layer which are multiplexed with different power values in a power domain; and
    a processor configured to obtain the enhanced MBMS layer by cancelling a power of the basic MBMS layer from the received MBMS signal,
    wherein the basic MBMS layer is received from a serving cell and a neighbor cell by a single frequency network (SFN) scheme and
    wherein the enhanced MBMS layer is received from the serving cell, except the neighbor cell.

10. The user equipment of claim 9, wherein the user equipment assumes that a ratio between an energy per resource element (EPRE) of the power of the basic MBMS layer and an EPRE of a multimedia broadcast single frequency network (MBSFN) reference signal is 0 dB.

11. The user equipment of claim 9, wherein the power of the basic MBMS layer canceled from the MBMS signal includes the power of the basic MBMS layer received from the serving cell and the power of the basic MBMS layer received from the neighbor cell.

12. The user equipment of claim 11, wherein the user equipment measures the power of the basic MBMS layer transmitted by the neighbor cell through a nulled resource on which the serving cell does not perform the transmission of the basic MBMS layer.

13. The user equipment of claim 11, wherein the user equipment corrects a power offset between the basic MBMS layer and the enhanced MBMS layer signaled from the serving cell based on the power of the basic MBMS layer received from the neighbor cell.

14. The user equipment of claim 9,
    wherein a power higher than that of the enhanced MBMS layer is assigned to the basic MBMS layer and
    wherein the user equipment obtains the basic MBMS layer from the MBMS signal by assuming the power of the enhanced MBMS layer as a noise.

15. The user equipment of claim 14, wherein the user equipment improves a quality of a multimedia content provided through the basic MBMS layer using the enhanced MBMS layer.

* * * * *